United States Patent [19]
Ely

[11] Patent Number: 4,893,663
[45] Date of Patent: Jan. 16, 1990

[54] CONTROL SYSTEM AND METHOD FOR AUTOMATIC ADJUSTMENT OF LATHE COMPONENTS IN RESPONSE TO TEMPERATURE OF LOG

[75] Inventor: Gary W. Ely, Canby, Oreg.

[73] Assignee: The Coe Manufacturing Company, Portland, Oreg.

[21] Appl. No.: 337,897

[22] Filed: Apr. 14, 1989

Related U.S. Application Data

[63] Continuation-in-part of Ser. No. 276,969, 11-28-88

[51] Int. Cl.$^4$ ............................ B27B 1/00; B27L 5/02
[52] U.S. Cl. ........................................ 144/356; 83/370; 144/213; 144/357; 144/365; 364/474.09
[58] Field of Search ...................... 250/338.1; 144/2 R, 144/209 R, 213, 356, 357, 365; 83/370; 364/474.09

[56] References Cited

U.S. PATENT DOCUMENTS

| | | | |
|---|---|---|---|
| 4,222,421 | 9/1980 | Walser et al. | 144/213 |
| 4,380,259 | 4/1983 | Brookhyser et al. | 144/357 |
| 4,506,714 | 3/1985 | Showm | 144/209 R |
| 4,708,180 | 11/1987 | Browning et al. | 144/213 |
| 4,791,970 | 12/1988 | Walser et al. | 144/213 |

Primary Examiner—W. Donald Bray
Attorney, Agent, or Firm—Klarquist, Sparkman, Campbell, Leigh & Whinston

[57] ABSTRACT

A veneer lathe apparatus control system and method are described for automatic adjustment of lathe components which engage the log during peeling in response to reduction of the log diameter and to changes in the surface temperature of the log. The lathe components which are automatically adjusted include the lathe knife pitch angle, the knife gap spacing from the nose bar, and the radial positions of backup idler rolls and of core drive rolls. A computer control system is employed for such automatic adjustment of the lathe components in response to control signals produced by a temperature sensor which senses the surface temperature of the log and by a lathe carriage position sensor whose output indicates the diameter of the log as it is being peeled. Adjustment curves selected by the computer, such as pitch angle profiles and knife gap curves, are stored as data tables in the data memory of the computer. These adjustment curves include families of curves for many species of wood with each family having curves of different log temperatures to provide offset temperature adjustments between adjacent curves for different temperature ranges.

15 Claims, 6 Drawing Sheets

CONTROL SYSTEM AND METHOD FOR AUTOMATIC ADJUSTMENT OF LATHE COMPONENTS IN RESPONSE TO TEMPERATURE OF LOG

REFERENCE TO RELATED APPLICATION

The present application is a continuation in part of U.S. patent application Ser. No. 07/276,969, filed Nov. 28, 1988, by Gary W. Ely, entitled "Control System and Method for Automatic Adjustment of Lathe Knife Pitch."

BACKGROUND OF THE INVENTION

The subject matter of the present invention relates generally to veneer lathe apparatus for peeling sheets of veneer from a rotating log by means of a lathe knife and associated nose bar and, in particular, to an electrical control system and method for automatic adjustment of lathe components which engage the log. The adjusted lathe components include the lathe knife pitch angle, the knife to nose bar spacing (referred to as the "knife gap"), and the radial position of the backup idler rolls or the core drive rolls. These lathe components are automatically adjusted by a computer control system in response to reduction of the diameter of the log as well as being provided with offset temperature adjustments in response to changes in the surface temperature of the log during peeling.

As shown in U.S. Pat. No. 4,708,180 of R. A. Browning, et al., issued Nov. 24, 1987, it has heretofore been the practice to provide a veneer lathe with automatic adjustment of the lathe knife pitch angle by a mechanical control including a cam follower roller on the knife carriage which rolls along a pitch rail cam member. The slope of the pitch rail is set manually or by other mechanical adjustment means prior to the start of peeling, and the knife pitch is then adjusted entirely by movement of the cam follower roller along the surface of the pitch rail during peeling. In most cases, the pitch rail is linear with a constant slope. However, such roll may be provided with a custom profiled end portion of changing slope for small diameter logs as discussed in the Browning patent. Unfortunately, such a custom-made pitch rail having an end portion of different slope does not apply to all species or types of wood. In addition, manual adjustment of the pitch rail to set the slope angle at the start of the peel is time consuming and inaccurate. The above-cited Browning patent also discloses the use of an automatic control means employing a computer for adjusting the knife gap between the lathe knife and a nose bar roll engaging the log immediately in front of the knife in response to changes in the log diameter and knife pitch during peeling. However, there is nothing in this patent which teaches that the pitch angle of the knife or the knife gap or other lathe components which engage the log, such as the backup idler rolls or core drive rolls, should be adjusted automatically in response to changes in log temperature by an electrical control system including a digital computer in accordance with tables of the component adjustments stored in the memory of such computer in the manner of the present invention.

During the veneer peeling process, better quality veneer is usually produced when the lathe knife pitch angle and knife gap are varied as the radius of the log diminishes during peeling. Also, the quality of the veneer is improved if the log is heated above room temperature by soaking in hot water or steam for at least several hours before peeling. Typically, the knife pitch angle, which is the angle the front cutting edge of the knife makes with a vertical plane passing through the tip of such knife, varies from a positive angle or "lead" where the knife is tipped away from the log for logs of large diameter to a negative pitch angle or "heel" where the knife blade is inclined toward the log for small diameter log blocks. The difficulty is that the manner in which the knife pitch angle and knife gap should be varied during peeling is different for different species or types of wood and for different temperatures of the log block during peeling. This requires frequent manual adjustment of the slope of the pitch rail and replacement of any custom profile pitch rail with another profile when such rail is provided with an end portion of changing slope. These problems are overcome in the present invention by electrical control of the lathe knife pitch angle using a digital computer having digital data representing different profiles of pitch angle adjustment corresponding to different wood species logs at different log temperatures, provided as a plurality of different knife pitch tables stored in the memory of the computer.

In the electrical control system of the present invention, the computer is employed to control adjustment of the knife pitch by adjustment of the vertical position or height of the cam follower roller on the knife carriage to support such carriage at different heights above the pitch rail. In the preferred embodiment, the height adjustment of the cam follower roller is accomplished by means of an eccentric which is rotated by a lever arm connected to the piston rod of a pitch adjustment cylinder operated by a servo valve in response to a pitch control output signal of the computer which changes with the diameter and the surface temperature of the log during peeling. The cylinder contains a transducer which produces a piston rod position signal corresponding to such height which is fed back to the computer to provide a closed loop feedback control in order to accurately set the pitch angle within 0.01 degree as a function of the horizontal position of the main knife carriage along the pitch rail and of the log surface temperature during peeling.

The control system of the present invention can also be used to control adjustment of the knife gap by means of another eccentric. This eccentric is also rotated by a lever arm connected to the piston rod of a gap adjustment cylinder operated by a servo valve in response to a gap control output signal of the computer which changes with the diameter and surface temperature of the log during peeling.

The present invention has the advantage that different pitch angle profiles for adjustment of the lathe knife pitch angle and different knife gap adjustment curves are easily defined and revised by changing the data entries stored in the computer memory. In addition, the computer enables quick selection of the appropriate pitch profile from a plurality of pitch profile tables stored in such memory. The same is true of different knife gap adjustment curves provided by different knife gap tables stored in the computer memory. Also, the ability to develop more optimum pitch profiles and knife gap curves for different wood species and different log temperatures is made possible. As a result, the quality of veneer is improved, and the production output of the veneer lathe is increased.

SUMMARY OF THE INVENTION

It is, therefore, one object of the present invention to provide an improved veneer lathe adjustment apparatus and method using an electrical control system for automatically adjusting lathe knife pitch angle, knife gap or other lathe components which engage the log during peeling as the radius of the log block diminishes and to compensate for changes in the surface temperature of the log block.

Another object of the invention is to provide such an apparatus and method in which the lathe knife pitch angle, knife gap, or the radial positions of backup idler rolls or core drive rolls are adjusted in a fast, accurate manner by a computer control system.

A further object of the invention is to provide an automatic lathe adjustment apparatus and method in which a plurality of different knife pitch profiles or knife gap adjustment curves or curves of the radial positions of backup idler rolls or core drive rolls defined by data tables are stored in the memory of a digital computer so that such profiles and curves may be selected in a rapid and precise manner by the computer.

An additional object of the invention is to provide such an automatic lathe control apparatus and method in which the data tables for the adjustment curves stored in the computer can be easily defined and revised by data entries in such stored data tables for different log diameters and log surface temperatures.

Still another object of the invention is to provide such an apparatus and method in which the lathe knife pitch angle or knife gap is quickly and easily changed during peeling by rotating an eccentric in response to a computer output signal corresponding to the desired pitch angle or knife gap and temperature offset adjustment.

A further object of the invention is to provide a closed loop computer control system for automatically adjusting a lathe knife pitch angle or a knife gap in response to surface temperature changes of log blocks in a lathe during peeling in a fast, accurate manner.

A still further object of the invention is to provide such a lathe adjustment control system in which the surface temperature of the log block is sensed by infrared sensor means which senses infrared radiation emitted from the surface of the log block.

DESCRIPTION OF DRAWINGS

Other objects and advantages of the present invention will be apparent from the following detailed description of a preferred embodiment thereof and from the attached drawings of which.

DESCRIPTION OF PREFERRED EMBODIMENT

Figure 1:
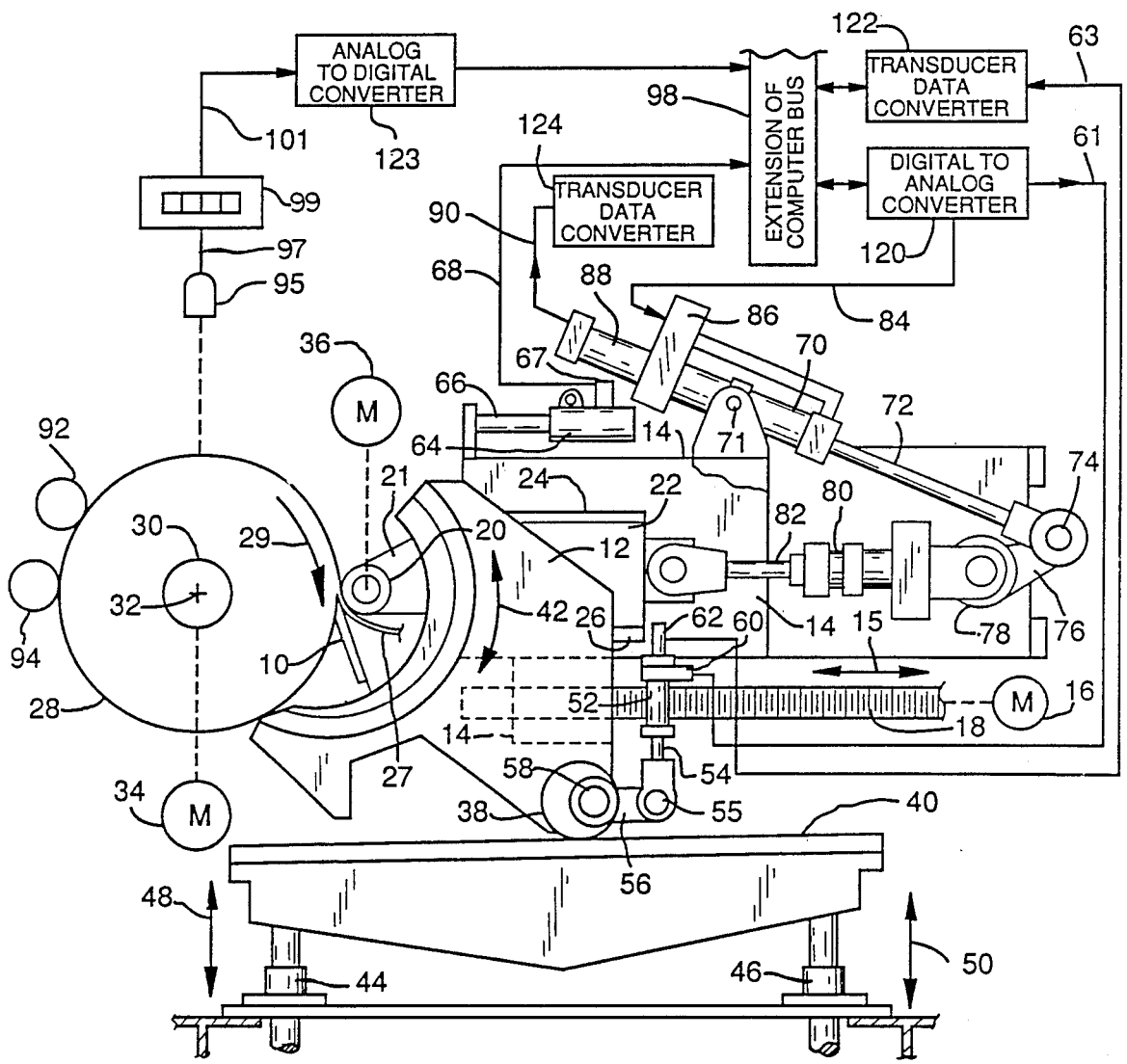
Fig. 1 is a partially diagrammatic end view of a veneer lathe adjustment apparatus in accordance with the invention.

As shown in FIG. 1, one embodiment of the veneer lathe apparatus of the present invention includes a lathe knife 10 supported for pivoting movement on a knife carriage 12, which is pivotally mounted on a main lathe carriage 14. The main carriage 14 is moved in a horizontal direction 15 by an electric motor 16 whose output shift is geared to a pair of drive screws 18 at the opposite ends of the main carriage. The main carriage 14 also supports a nose bar roll 20 which is mounted by support arms 21 on a roll carriage 22 for adjustment of the knife gap between such roll and the knife by sliding movement within a pair of spaced guide channels 24 and 26 attached to the main carriage 14. The nose bar roll 20 is urged against the outer surface of a log block 28 to compress such surface at a position immediately in front of the knife blade 10 and is spaced from such knife by a gap corresponding to the thickness of the veneer to be peeled from such log block. As a result, the knife blade peels thin sheets of wood veneer 27 from the surface of the log block 28 as such log block is rotated in a clockwise direction 29 in FIG. 1.

The log block is driven in any suitable manner such as by a pair of powered spindles 30 which engage the opposite ends of the log at its central axis to rotate such log about an axis of rotation 32. The lathe spindles 30 are suitably coupled to an electric motor 34 for rotation in a conventional manner. The nose bar roll 20 may also be driven by connecting it to another electric motor 36 for rotating such nose bar roll and causing it to apply additional torque to the log for rotation thereof during peeling.

Figure 3:
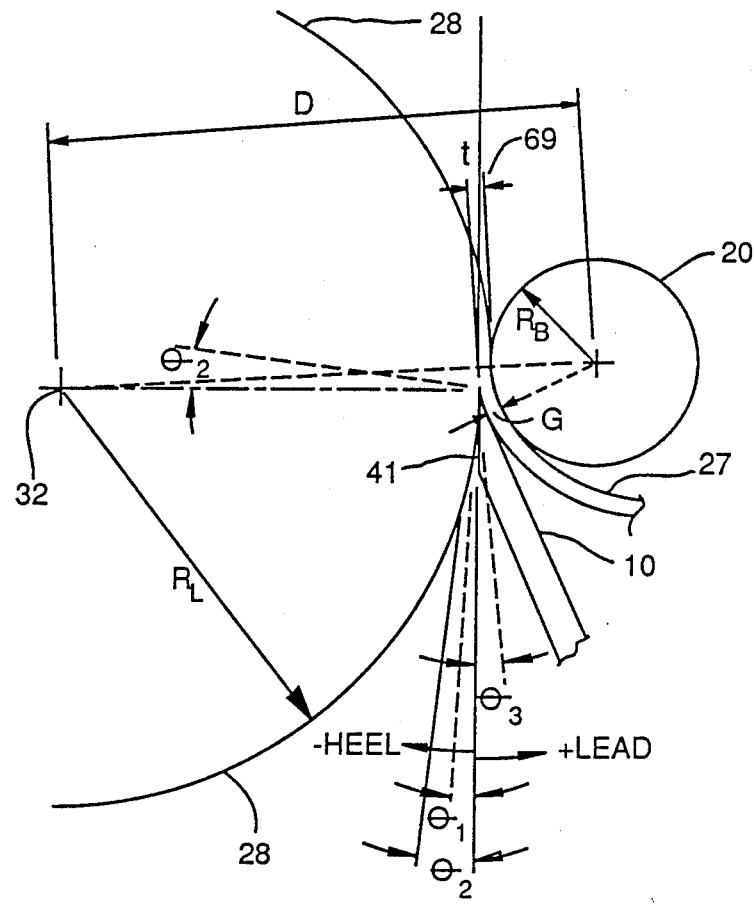
FIG. 3 is an enlarged view of a portion of the apparatus of FIG. 1 showing adjustment of the knife pitch and knife gap.

During peeling, the knife blade 10 is moved horizontally toward the axis of rotation 32 of such block by movement of the main carriage 14 in the direction 15 with the motor 16 as the diameter of the block reduces. The knife carriage 12 is adjustably mounted on a cam follower roller 38, which rolls along a pitch rail cam member 40. The pitch rail 40 is provided with a predetermined slope so that as the cam follower roller 38 moves along such pitch rail, it causes the knife carriage 12 to pivot in the clockwise and counterclockwise directions of arrows 42 about the point of the knife blade 10. As a result of adjustment of the height of roller 38 on the knife carriage 12 and the slope of the rail 40, the pitch angle of the knife blade between the blade's front surface 41 and a vertical plane may be varied positively and negatively from an angle of zero degree where the front surface of the knife blade is vertical, as shown in FIG. 3. The range of variation of the knife pitch angle is between a positive pitch angle or "lead" of up to +1 degree in a clockwise direction away from the log and a negative angle or "heel" of up to about −5 degrees in a counterclockwise direction toward the log in FIG. 1 when the slope of the rail 40 is zero or parallel to the horizontal direction 15. Thus, the pitch angle of the knife blade is set by the slope of the pitch rail cam 40 and by the height of the cam follower roller 38 on the knife carriage 12. Rail 40 can be set to a background slope enabling total operating range of pitch adjust from +10 degrees to −10 degrees.

Normally, the pitch rail 40 has a constant slope, but it may be provided with an end portion of changing slope nearest the log which is greater than the slope of its other portion, as shown by element 120 in U.S. Pat. No. 4,708,180. However, different species of wood and different wood conditions of the same species require changes in the pitch profile for optimum yield of veneer of substantially uniform thickness and high quality. This pitch angle profile change for different species of wood is conventionally done manually by adjusting the slope of the pitch rail 40 before peeling through adjustment of a pair of threaded mounts 44 and 46 at the opposite ends of the pitch rail with wrenches or a manually controlled motor. Thus, the mounts are rotated to adjust the height of the pitch rail by raising or lowering the ends of such rail in the direction of arrows 48 and 50 in order to set the rail slope. This manual adjustment of the slope of the pitch rail is slow and inaccurate, resulting in lower quality veneer and reduced production. The electrical control system of the present invention overcomes this problem by allowing rapid selection between a plurality of predetermined pitch profiles stored in the computer memory as pitch data tables which can be easily changed by inputting new data with the computer terminal, as hereafter described.

The electrical control system for adjusting the knife pitch angle in accordance with the present invention includes a pitch adjustment cylinder 52 fixed at one end to the main carriage 14. The piston rod 54 of the pitch adjustment cylinder is pivotally connected at pivot 55 to one end of a lever arm 56 to rotate such lever arm. The lever arm 56 is connected at its other end to the shaft of an eccentric 58 which causes the center of the cam follower roller 38 to orbit about the axis of the eccentric to raise such cam follower roller to different heights on the knife carriage 12 in response to pivotal rotation of the lever arm of about 90 degrees or less by the pitch adjust cylinder 52. These adjustments of the height of the cam follower roller 38 on the knife carriage 12 cause such knife carriage to rotate the knife to different angles corresponding to such heights at any given position along the pitch rail 40. Thus, by adjusting the height of the cam follower roller 38 on the knife carriage 12, several different effective pitch profiles are provided for a given pitch rail 40 to change the pitch angle of the knife blade in accordance with different wood species and different wood conditions in a fast, accurate manner.

The pitch adjustment cylinder 52 is controlled by a servo valve 60, which is operated by the pitch control output signal at output terminal 61 of a digital computer in the computer control system of FIG. 2 as hereafter discussed. The position of the piston rod 54 in the pitch adjustment cylinder 52 corresponding to the height of the cam follower roller 38 is sensed by a transducer 62 to produce a height output signal which is applied to input terminal 63 of the computer control system. A main lathe carriage position cylinder 64, fixed to the frame of the lathe and whose movable piston rod 66 is connected to the main carriage 14 for movement with such carriage, causes a transducer 67 coupled to such piston rod to produce a lathe carriage position signal corresponding to the log block radius. This main carriage position signal is applied at an input 68 of the computer to indicate the log radius or the position of the knife blade 10 relative to the axis of rotation 32 of the log during peeling. The transducers 67 and 62 may be sonic pulse waveguide transducers of the Temposonics-type described in U.S. Pat. No. 4,708,180.

The horizontal knife gap 69 between the front surface 41 of the knife blade 10 and the nose bar roll 20 shown in FIG. 3 may also be automatically adjusted by the computer in response to changes in diameter of the log block 28 and changes in knife pitch by means of a gap adjustment cylinder 70 mounted at pivot 71 on the main carriage 14. The piston rod 72 of such cylinder is pivotally connected at pivot 74 to a lever arm 76 which rotates an eccentric 78 that is pivotally attached to a second cylinder 80 to adjust the nose bar to knife gap. The second cylinder 80 has its piston rod 82 connected to the nose bar carriage 22 for reciprocating the nose bar roll 20 between the contact position shown in FIG. 1 with such roll in contact with the log during peeling and a retracted position in which the roll is removed from contact with the log to allow loading of new logs into the lathe. The gap between the nose bar roll 20 and the knife blade 10 is adjusted during peeling by means of the gap adjust cylinder 70 in response to gap control signals transmitted from a computer output 84 to a servo valve 86 controlling the cylinder 70. A gap spacing transducer 88 is attached to the gap adjustment cylinder 70 in order to sense the position of the position rod 72 in such cylinder which corresponds to the gap spacing between the knife blade and the nose bar roll 20. The transducer 88 produces a gap spacing output signal which is applied to an input terminal 90 of the computer.

The operation of such nose bar roll gap adjustment in response to reduction in the diameter of the log block during peeling is described in greater detail in U.S. Pat. No. 4,708,180 of Browning, et al., issued November 1987.

Figure 6:
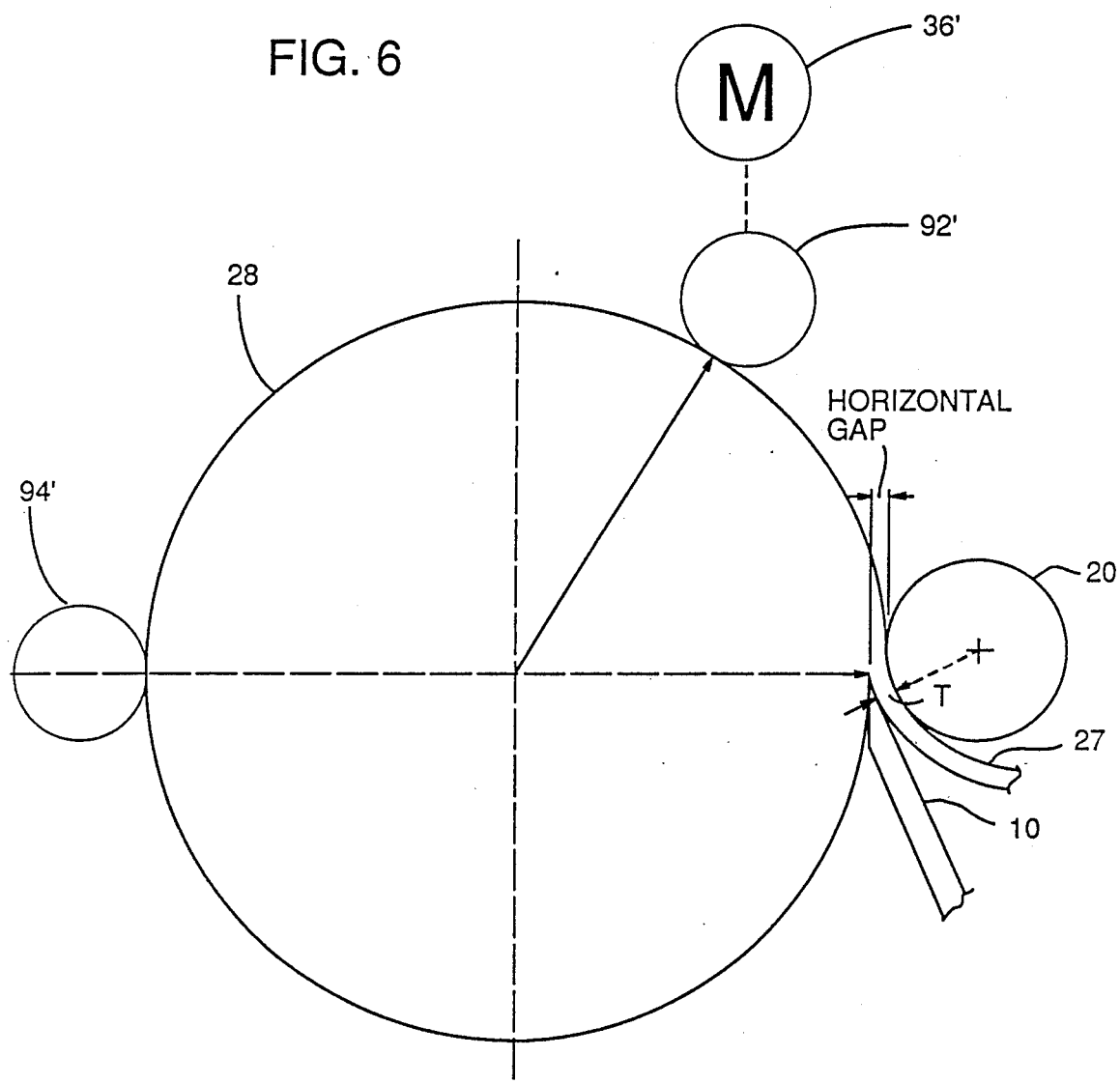
FIG. 6 is an enlarged view of a portion of the apparatus of FIG. 1 which has been modified by replacing the backup idler rolls with core drive rolls.

It should be noted that a pair of backup idler rolls 92 and 94 may be provided which are moved into contact with the surface of the log block 28 on an opposite side thereof from the knife blade 10 and nose bar roll 20 when the log block has been peeled to a small diameter on the order of about 8 inches. Thus, the backup rolls 92 and 94 prevent the bending of log blocks of small diameter during peeling due to the pressure of the knife and nose bar. Alternatively, the backup idler rolls 92 and 94 of FIG. 1 may be replaced with the core drive rolls 92′ and 94′ of FIG. 6. Thus, in FIG. 6, one of the backup rolls, roll 92′, may be driven by a motor 36′ to supply auxiliary power for rotating the log so that such rolls operate as "core drive" rolls. The motor-driven backup roll 92′ may be radially and angularly adjusted during peeling relative to the other backup roll 94′ which is an idler, as shown in U.S. Pat. No. 4,380,259 of Brookhyser, et al., issued Apr. 19, 1983. The backup rolls, whether they are backup idler rolls or core drive rolls, are moved radially toward the center of rotation 32 of the log block during peeling with automatic adjustment by the computer in response to reduction of the diameter of such log. Also, the backup rolls may be provided with offset temperature adjustments in a radial direction either toward or away from such center, depending on the surface temperature of the log, as hereafter described.

A temperature sensor device 95 is mounted above the side of the log 28 at the middle of such log to sense the infrared radiation emitted from the surface of such log and thereby determine the surface temperature of the log during peeling as shown in FIG. 1. The temperature sensor device 95, shown in FIG. 5, produces an electrical control signal on its output terminal 97, whose amplitude corresponds to the temperature of the log. This control signal is transmitted through a temperature display device 99 which displays the value of such log temperature to an input terminal 101 of the computer for providing an offset adjustment to the knife gap and the knife pitch angle adjustment by such computer in a manner hereafter described.

Figure 2A:
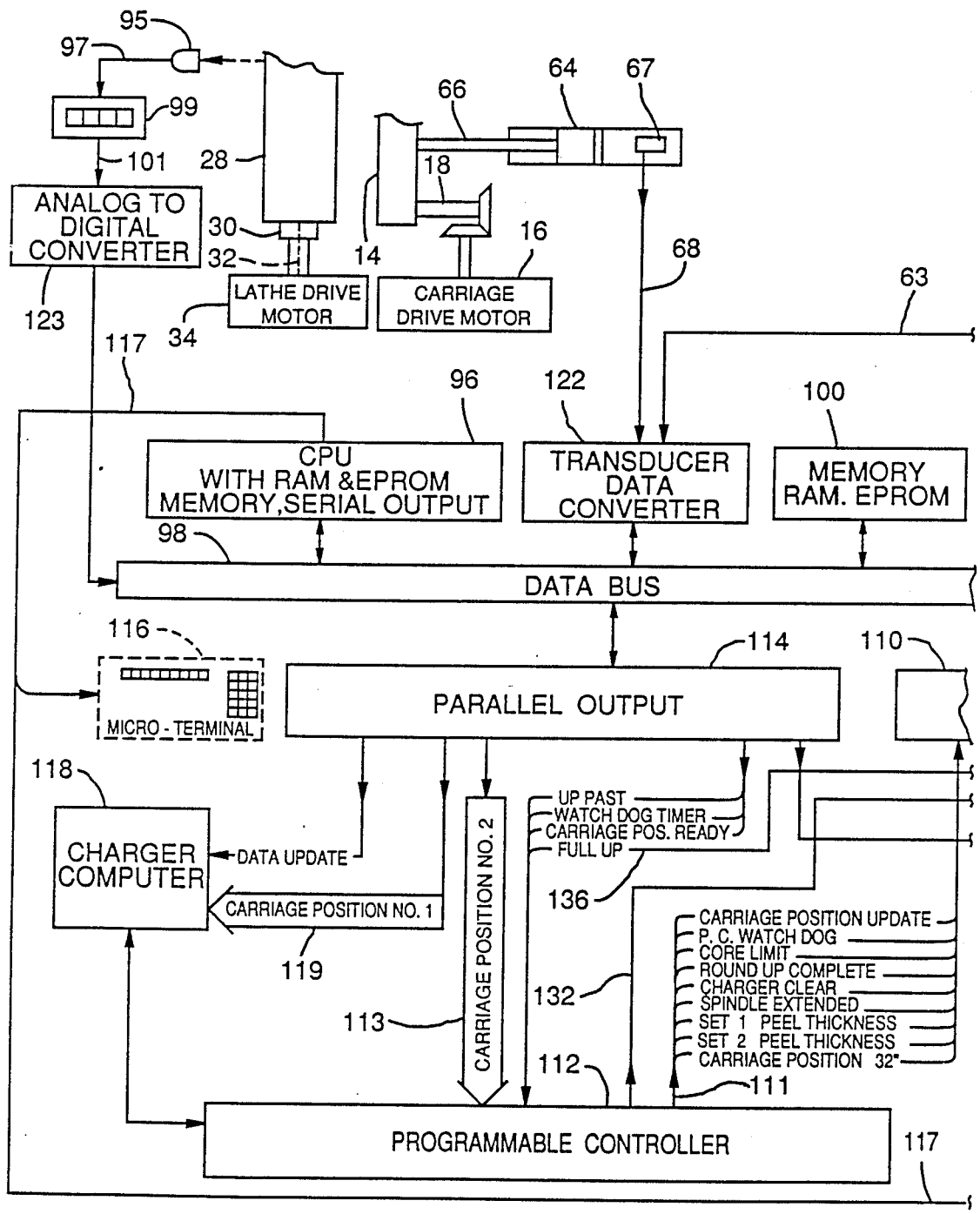
FIGS. 2A and 2B together form a schematic diagram of a computer control system which may be employed for the apparatus of FIG. 1.
Figure 2B:
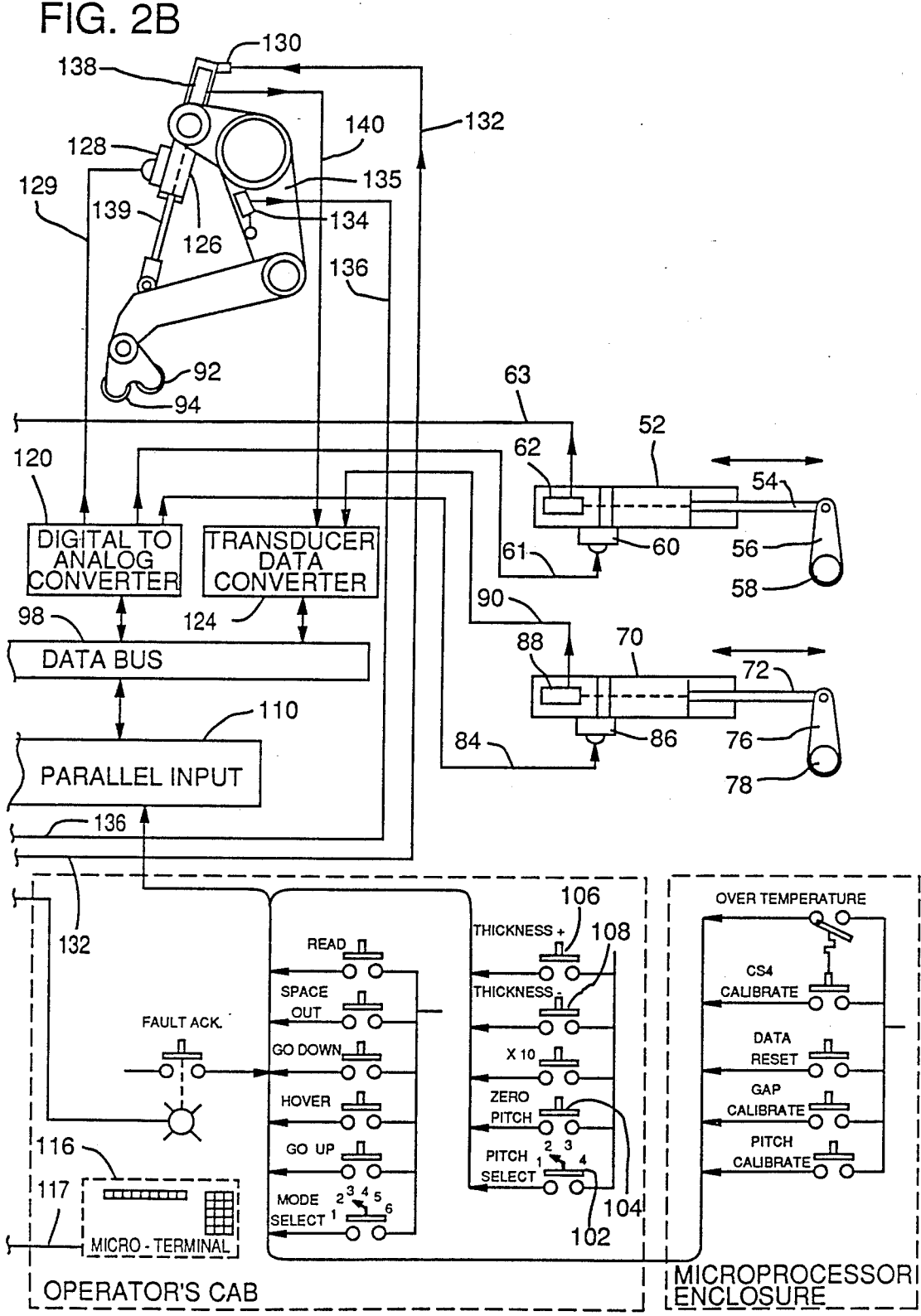

A computer control system for adjusting the lathe knife pitch angle and the knife gap in accordance with the present invention is shown in FIGS. 2A and 2B. Such computer control system includes a central processing unit (CPU) 96 of a general purpose digital computer which contains a digital data memory including a random access memory (RAM) and an electronic programmable read-only memory (EPROM) in which the computer program for operating such system is stored. The CPU 96 is connected by a serial output to a data bus 98 including parallel lines having a plurality of inputs and outputs. A digital data storage memory 100, consisting of a RAM and an EPROM is employed to store the data of several knife pitch angle profiles, knife gap adjustment curves, and backup roll adjustment curves for different species of wood.

Figure 4A:
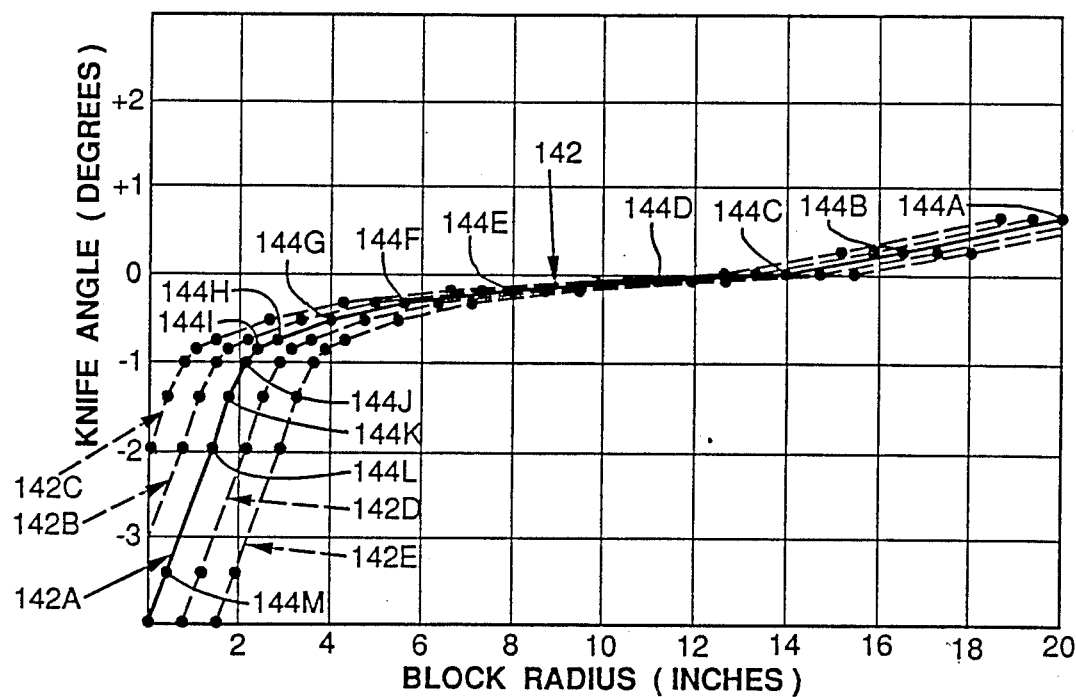
FIG. 4A is a diagrammatic view of a typical family of lathe knife pitch angle profiles at different log surface temperatures which are stored as pitch data tables in the memory of the computer system of FIG. 2.

A family of pitch angle profiles for different log temperatures are stored in memory 100 in the form of pitch data tables such as that shown in FIG. 4A. The pitch angle profiles may each be formed by 14 pairs of data points corresponding to the various knife pitch angles at different log block radii or distances from the knife to the axis of rotation 32 of such block for a given surface temperature range of the log block.

Figure 4B:
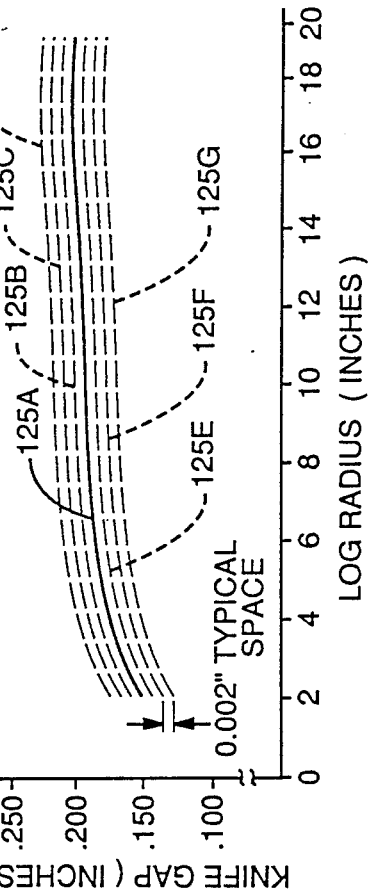
FIG. 4B is a diagrammatic view of a typical family of knife gap curves at different log surface temperatures which are stored as knife gap tables in the memory of the computer system.

Similarly, a family of knife gap adjustment curves for different log temperatures may also be stored in memory 100 in the form of data tables, such as that shown in FIG. 4B, as hereafter described.

Four different families of pitch profiles, each family like that of FIG. 4A, may be stored in the computer memory 100 and selectively accessed by the computer control system with a pitch selection switch 102. The pitch selection switch has four different switch positions corresponding to such four families of pitch rail profile tables. In addition, a zero pitch angle control switch 104 is provided to calibrate the pitch adjust system to the front face bevel 41 ground into knife 10, as well as two veneer thickness adjustment settings 106 and 108. These switches all supply input signals through a parallel input circuit 110 and the data bus 98 to the computer. Peel thickness signals "set 1 peel thickness" and "set 2 peel thickness" corresponding to two different base veneer thicknesses, such as 0.100 inch and 0.200 inch, are transmitted from output 111 of a programmable controller 112 through the parallel input 110 to the CPU 96. Such programmable controller also receives input information from the computer, such as the knife "carriage position No. 2" signal at input 113, through a parallel output circuit 114. The thickness adjustment switches 106 and 108 are for "fine tuning" adjustment of the knife gap between the knife blade and the nose bar roll for a selected veneer thickness in order to compensate for knife dullness and other lathe variables. A computer terminal 116 is provided for manual input of data and for displaying output information gathered by the computer, such terminal being connected by lead 117 to the central processing unit 96.

A lathe charger computer 118 may also be provided for controlling the measurement and centering of logs in a lathe charger (not shown) and for transmitting such logs into the lathe with such lathe charger. Charger computer 118 does not control the knife pitch adjustment. However, such charger computer may be connected to the parallel output circuit 114 of the above-described computer, including CPU 96, to receive control signals including lathe "carriage position No. 1" signal at input 119 so that the veneer lathe charger does not transfer logs into the lathe until peeling of the previous log is finished and the main lathe carriage has been retracted far enough to allow clearance for loading next log.

As shown in FIGS. 2A and 2B, the pitch adjustment cylinder 52 has its servo control valve 60 connected to the output 61 of a digital-to-analog converter 120 of the computer control which converts the digital data received from the computer corresponding to a pitch rail profile tables stored in memory 110 into an analog pitch adjustment signal. The pitch adjustment signal causes the pitch adjustment cylinder 52 to rotate the pitch adjustment eccentric 58 to change the height of the cam follower roller 38 on the knife carriage 12 to the proper value of the desired pitch angle for the log diameter corresponding to the position of such cam follower roller on the pitch rail 40. The transducer 62 of the pitch adjustment cylinder 52 transmits a height position signal corresponding to the position of the piston rod 54 to input 63 of a transducer data converter 122. From this transducer signal, the computer can determine when the selected height of the cam follower roller corresponding to the desired pitch angle is reached and then terminate the pitch adjustment signal applied to valve 60. Thus, a closed-loop feedback control system is provided.

It should be noted that the position of the main carriage 14 corresponding to the distance of the knife blade 10 from the axis of rotation 32 of the log or to the radius of such log is provided by an output signal of the position transducer 67 of the carriage position cylinder 64. The main carriage position signal is transmitted from the transducer 67 to input 68 of the transducer data converter 122. This main carriage position signal enables the CPU to determine the knife pitch angle from the selected pitch profile table stored in the computer 100 which has been selected by the pitch select switch 102 and by the temperature offset adjustment control signal produced by the temperature sensor device 95 corresponding to the log surface temperature. The temperature offset adjustment control signal is applied at computer input 101 to an analog-to-digital converter 123 whose output is connected to the CPU 96 through bus 98.

The knife gap adjustment cylinder 70 is also provided with a servo valve 86 connected to the output 84 of the digital-to-analog converter 120 which is coupled through the data bus 98 to the CPU 96. As a result, the knife gap control cylinder 70 is caused by the computer to rotate lever arm 76 and the eccentric 78 to adjust the gap between the nose bar roll 20 and the knife blade 10 in accordance with the radius of the log block 28 being peeled which is determined from the output 68 of the main carriage transducer 67 that is applied to the transducer data converter 122, as discussed above. A knife gap spacing transducer 88 coupled to the piston rod 72 of the nose bar roll gap cylinder 70 produces a gap spacing signal which is applied to input 90 of the transducer data converter 124. The converter 124 applies the gap spacing signal through the data bus 98 to the CPU 96 which, when the desired gap spacing is reached, terminates the gap adjustment signal applied to valve 86. Thus, the nose bar roll gap is also adjusted by a closed-loop control system.

The computer CPU 96 also processes the temperature offset adjustment control signal produced at the output of the log temperature sensor device 95 in order to select the proper knife gap adjustment curve for the sensed temperature from the family of knife gap curves shown in FIG. 4B which are stored in the memory 100. This causes an offset adjustment signal to be applied by the computer to the servo valve 86 of the knife gap adjustment cylinder 70 in order to adjust the gap for changes in log surface temperature. Thus, as shown in FIG. 4B, one family of, for example, seven knife gap curves 125A to 125G are stored for different temperature ranges of 10° F. apart and are vertically separated by an approximate spacing of about 0.002 to 0.004 inch. Such curves include a nominal first curve 125A at a temperature range of 80° to 90° F., and three curves above such first curve including a second curve 125B at a temperature range of 70° to 80° F., a third curve 125C at a temperature range of 60° to 70° F., and a fourth curve 125D at a temperature range of 50° to 60° F. Similarly, below the first curve are three more curves, including a fifth curve 125E for a temperature range of 90° to 100° F., a sixth curve 125F for a range of 100° to 110° F., and a seventh curve 125G for a range of 110° to 120° F.

Each of the knife gap curves is separated vertically from the adjacent curves by a typical spacing of about 0.002 to 0.004 inch and the computer may adjust from one curve to another during the peeling of a log in response to changes in surface temperature detected by sensor 95. For example, with a spacing of 0.002 inch, if the first curve 125A has a gap of 0.150 inch for a log radius of 2 inches and a gap of 0.200 inch at a log radius of 16 inches, then the second curve 125B has a gap of 0.152 inch at a log radius of 2 inches and a gap of 0.202 inch at a log radius of 16 inches because of the 10° F. lower temperature range for curve 125B than for curve 125C. This relationship between temperature and knife gap is expressed by the following table of knife gaps for such curves:

| Knife Gap Curve | Log Temperature Range (°F.) | Knife Gap at Log Radius | |
|---|---|---|---|
| | | 2 inch | 16 inch |
| 125A | 80 to 90 | 0.150 | 0.200 |
| 125B | 70 to 80 | 0.152 | 0.202 |
| 125C | 60 to 70 | 0.154 | 0.204 |
| 125D | 50 to 60 | 0.156 | 0.206 |
| 125E | 90 to 100 | 0.148 | 0.198 |
| 125F | 100 to 110 | 0.146 | 0.196 |
| 125G | 110 to 120 | 0.144 | 0.194 |

Backup idler rolls 92 and 94 may be moved into engagement with the log block 28 after such log block has been peeled to a small diameter of, for example, about 8 inches diameter by an actuation cylinder 126 controlled by a servo valve 128 connected to an output 129 of the digital-to-analog converter 120. Thus, the servo valve 128 controls the cylinder 126 in response to a computer output signal to move the backup rolls 92 and 94 into engagement with the log when it reaches a diameter of 8 inches. The cylinder 126 continues to adjust the radial position and to move the backup rolls toward the axis of rotation 34 of such log in response to a computer output control signal as the radius of the log decreases during peeling until peeling stops. At this time, a control signal is generated by the controller 112 and applied to fast-up valve 130 connected to actuation cylinder 126 to quickly raise the backup rolls to the retracted or full-up position, thereby allowing a new log to be loaded into the veneer lathe. A full-up limit switch 134 is provided on a support arm 135 for the backup rolls to produce an output signal which is applied at an input 136 of the programmable controller to tell it that the backup rolls have reached the full-up position. A transducer 138 produces a backup roll position signal corresponding to the position of the piston rod 139 of actuation cylinder 126 and supplies such position signal at computer input 140 to the transducer data converter 124. This tells the computer the position of the backup rolls relative to the axis of rotation of the log so they are maintained in contact with the surface of the log at the proper pressure during peeling.

The radial position of the idler backup rolls 92 and 94 relative to the log center 32 is adjusted by the computer in response to the surface temperature of the log which is sensed by the temperature sensor device 95 to produce a temperature offset control signal at computer input 101 in a similar manner to the knife gap adjustment previously discussed. Similarly, the radial position of core drive rolls 92' and 94' in FIG. 6, including powered backup roll 92' and idler roll 94', can also be adjusted by the computer in response to the surface temperature of the log by the computer producing a temperature offset signal which is applied to the positioning cylinder for such backup roll. For example, the core drive power roll 92' is provided with the following additional radial position offset adjustments away from the log for the indicated temperature ranges:

0.015 inch for 55° to 65° F.
0.013 inch for 65° to 85° F.
0.012 inch for 85° to 105° F.
0.010 inch for 105° to 115° F.
0.008 inch for 115° to 125° F.
0.006 inch for 125° to 135° F.,
0.004 inch for 135° to 145° F.
0.003 inch for 145° to 155° F.
0.002 inch for 155° to 165° F.
0.001 inch for 165° F. and above A family of five knife pitch angle profiles 142A to 142E at different log temperature ranges which are exemplary of those stored in the computer memory 100 in the control system of FIG. 2, is shown in FIG. 4. Such profiles, which are typical for Douglas fir or hemlock, are each in the form of a curve of joined data points 144 representing a knife pitch angle at a given log block radius. The first pitch profile curve 142A consists of 13 data points, labeled 144A to 144M, corresponding to different knife pitch angles for different log block radius positions. Thus, point 144A has a positive pitch angle of about +0.6 degree at a block radius of 20 inches, point 144B has a pitch angle of +0.2 degree for a block radius of about 16.5 inches, while data point 144C has a pitch angle of zero degree at a block radius of 14 inches. Then the pitch angle decreases to negative angles of progressively greater magnitude as the block radius decreases. Thus, point 144D has a pitch angle of about −0.1 degree at about 11.2 inch radius, point 144E has a pitch angle of −0.2 degree at a radius of 8 inches and point 144F has a pitch angle of −0.35 degree at a radius of about 5.7 inches. The pitch angle decreases rapidly to an angle of −2.0 degrees at a radius of approximately 1.5 inches at point 144L which corresponds to a log block diameter of 3 inches. The pitch angle would be adjusted to an even lower pitch angle of −3.5 degrees at a block diameter of 1 inch at point 144M, if peeling to this small diameter is possible. Each of the pitch profiles 142A to 142E is horizontally separated from adjacent profiles by a spacing of approximately 0.75 inch and is for a different log temperature range which differs by 20° F. from the ranges of adjacent profiles. Thus, the first pitch profile 142A is for a temperature range of 80° to 100° F., the second pitch profile 142B is for a range of 60° to 80° F., the third pitch profile 142C is for a range of 40° to 60° F., the fourth pitch profile 142D is for a range of 100° to 120° F. and the fifth profile 142E is for a range of 120° to 140° F.

Each of these pitch profile curves is separated horizontally and vertically from the adjacent curves. For example, if the first curve 142A has a pitch angle of −1.0 degree at a block radius of 2 inches and a pitch angle of +0.25 degree at a block radius of 16 inches, the second curve 142B has a pitch angle of −0.8 degree at a block radius of 2 inches and a pitch angle of 0.30 degree at a block radius of 16 inches because of the 20° F. lower log temperature range for curve 142B than for curve 142A. This relationship between temperature and knife pitch angle for the curves is expressed in the following table:

| Knife Pitch Curve | Log Temperature Range (°F.) | Knife Pitch Angle (Degree) at Log Radius | |
|---|---|---|---|
| | | 2 inch | 16 inch |
| 142A | 80 to 100 | −1.0 | +0.25 |
| 142B | 60 to 80 | −0.8 | +0.30 |
| 142C | 40 to 60 | −0.7 | +0.35 |
| 142D | 100 to 120 | −2.0 | +0.20 |
| 142E | 120 to 140 | −3.0 | +0.15 |

Figure 5:
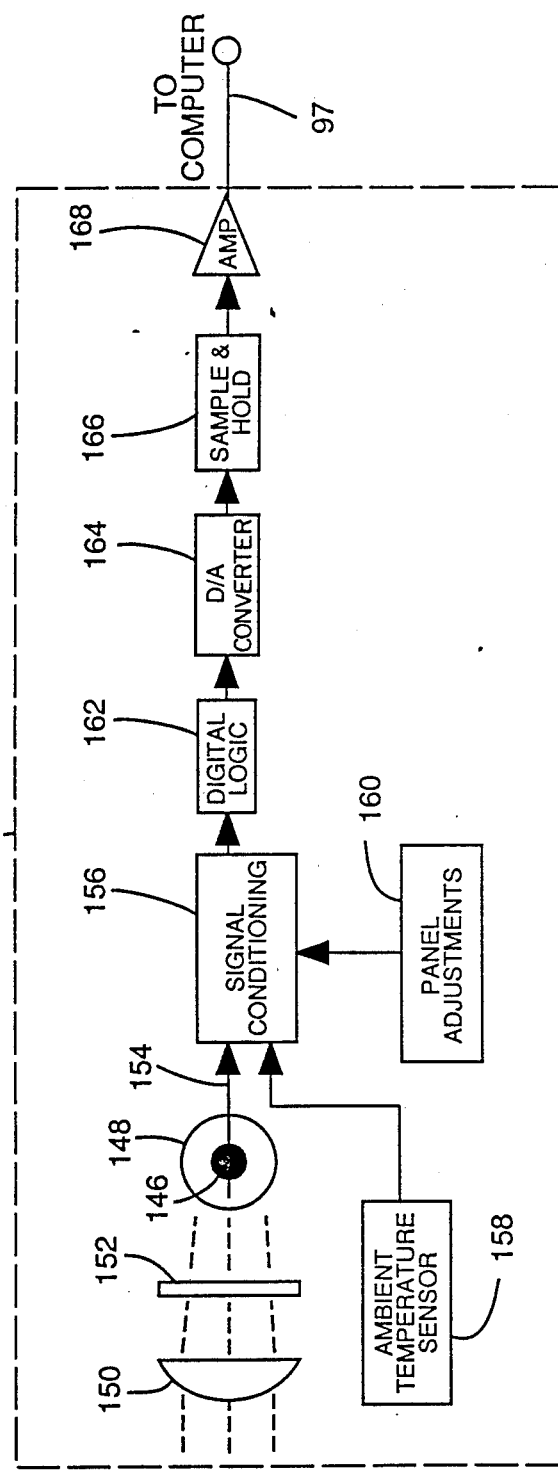
FIG. 5 is a schematic diagram of an infrared radiation sensor device used to sense the surface temperature of the log in FIGS. 1 and 2.

As shown in FIG. 5, the temperature sensor device 95, which may be a model ET3LTSF infrared energy transducer made by Raytek, Inc., of Santa Cruz, Calif., includes an infrared radiation detector 146, such as a thin film thermopile detector, surrounded by a light shield 148 which blocks light from undesired sources. A lens 150 focuses the infrared light radiation emitted from the log surface onto the detector 146 through an infrared filter 152 and the shield 148. The detector produces an electrical analog output signal on output 154 whose amplitude is proportional to the value of the sensed temperature. The output of the detector 146 is connected to one input of a signal conditioning circuit 156 whose other two inputs are connected to an ambient temperature sensor 158 and to panel adjustment controls 160 for comparison purposes. The signal conditioning circuit 156 has its output connected to the input of a digital logic circuit 162. As a result, the analog output signal of the infrared detector is digitized to a 12-bit digital signal and linearized by the digital logic circuit 162. The digital output of the digital logic circuit is applied to the input of a digital-to-analog converter 164 whose analog output is connected to a sample and hold circuit 166. The analog output signal of the sample and hold circuit 166 is transmitted through an amplifier 168 to the computer input 97 and serves as a control signal for the computer CPU 96 after passing through analog-to digital converter 123.

An important advantage of the present invention is that any of the data points on the pitch angle profile curves 142 or the knife gap curves 125 may be changed to provide a new pitch profile curve or a new knife gap curve simply by changing the data in the pitch profile table stored in the computer 100. This can be done by manually inputting a new data point by means of terminal 116. Thus, the present invention is an extremely versatile and accurate way of changing the pitch angle profiles for different wood species and different log conditions such as moisture content or sap content.

It will be obvious to one having ordinary skill in the art that many changes may be made in the above-described preferred embodiment of the present invention. Therefore, the scope of the invention should be determined by the following claims.

I claim:

1. A method of operating a veneer lathe apparatus including the steps of:
   rotating a log with powered drive means about an axis of rotation;
   peeling veneer from the log with a lathe knife as the log is rotated;
   compressing the surface of the log during peeling with a nose bar means at a position immediately in front of the lathe knife and spaced from said knife by a knife gap;
   sensing the temperature of the outer surface of the log with temperature sensor means during peeling to produce an electrical control signal corresponding to the sensed temperature; and
   automatically adjusting at least one lathe component engaging the log in response to said control signal.

2. A method in accordance with claim 1 in which the knife gap is automatically adjusted in response to the control signal.

3. A method in accordance with claim 1 in which the pitch angle of the lathe knife is automatically adjusted in response to said control signal.

4. A method in accordance with claim 1 which also includes the steps of:
   engaging the side of the log with a backup roll means during peeling at a position angularly displaced from said lathe knife to prevent deflection of the log core; and
   automatically adjusting the radial position of said backup roll means relative to the axis of rotation in response to said control signal.

5. A method in accordance with claim 1 in which the log is rotated by a core drive roll means engaging the side of the log, and includes the step of automatically adjusting the radial position of the core drive roll means relative to the axis of rotation in response to said control signal.

6. A method in accordance with any of the claims 2 to 5 in which the control signal is supplied to a digital computer means which controls the automatic adjustment.

7. A method in accordance with claim 6 in which the computer has stored in its digital data memory at least one data table of adjustments for different log temperatures.

8. A method in accordance with claim 1 in which the log is rotated by a powered spindle means and the nose bar means is a nose bar roll.

9. A method in accordance with claim 1 in which the temperature sensor means includes an infrared radiation sensor device which senses the infrared radiation emitted by the log to determine its temperature and produces a corresponding electrical output signal at the output of said sensor device.

10. Veneer lathe apparatus, comprising:
   drive means for rotating a log about an axis of rotation;
   knife means for peeling veneer from the log with a lathe knife as the log is being rotated by the drive means;
   nose bar means for compressing the surface of the log during peeling at a position in front of the lathe knife and spaced from said knife by a knife gap;
   temperature sensor means for sensing the temperature of the outer surface of the log during peeling and for producing an electrical control signal corresponding to the sensed temperature; and
   control means for automatically adjusting at least one of said knife gap and the pitch angle of the lathe knife in response to said control signal.

11. Apparatus in accordance with claim 10 which also includes backup idler roll means for engaging the side of the log during peeling at a position angularly displaced from the lathe knife to prevent deflection of the log core, and the control means also automatically adjusts the radial position of said backup roll means relative to the axis of rotation of the log in response to said control signal.

12. Apparatus in accordance with claim 10 which also includes core drive roll means for rotating the log by engagement with the side of said log, and the control means also automatically adjusts the radial position of said core drive roll means relative to the axis of rotation of the log in response to said control signal.

13. Apparatus in accordance with claims 10 to 13 in which the control means includes a digital computer means which controls the automatic adjustment in response to the control signal.

14. Apparatus in accordance with claim 13 in which the computer includes a digital data memory in which is stored a data table of the adjustments for different log temperatures.

15. Apparatus in accordance with claim 9 in which the temperature sensor means includes at least one infrared radiation detector which senses the infrared radiation emitted by the log to determine its temperature by producing a corresponding electrical output signal at the output of said detector.

* * * * *